United States Patent Office 3,342,789
Patented Sept. 19, 1967

3,342,789
COMPOSITION COMPRISING CHLORINATED BUTYL RUBBER AND A CURING SYSTEM
Eric Bannister, Blewbury, John Biggs, East Hagbourne, Samuel Howard Coulson, Reading, John Greenwood, Didcot, and Robert L. Zapp, London, England, assignors to Esso Research and Engineering Company, a corporation of Delaware
No Drawing. Filed July 31, 1962, Ser. No. 213,595
16 Claims. (Cl. 260—79.5)

This invention relates to new and improved mastic compositions. In particular the invention relates to mastic compositions that can be cold cured, that is at ambient temperatures, and to curing systems therefor.

We have found that halogenated hydrocarbon rubbery polymers of iso-olefins, or co-polymers of iso-olefins and multi-olefins, having a low degree of polymerisation, may be compounded with fillers, additives and curing agents to form useful mastic compositions and that, by the selection of suitable curing agents, the compositions may be cold cured. Typical of the halogenated rubbery co-polymers above mentioned are halogenated butyl rubbers. Butyl rubber is a rubbery co-polymer comprising a major proportion of an iso-olefin having 4 to 7 carbon atoms and a minor proportion of a multi-olefin having 4 to 8 carbon atoms ("Synthetic Rubber," edited by G. Whitby, Chapter 24). The most commonly employed iso-olefin is iso-butylene, although other iso-olefins, such as 3-methyl-1-butene and 4-methyl-1-pentene may be used. Suitable multi-olefins, which are generally conjugated diolefins, include isoprene, 1,3-butadiene, 2,3-dimethyl-1,3-butadiene and piperylene. Most of the co-polymers contain about 90 to 99.5 wt. percent iso-olefin and 0.5 to 10 wt. percent diolefin, which, in most instances, is isoprene. The polymerization is generally carried out at a low temperature, e.g. between $-50$ and $-165°$ C. in the presence of a Friedel-Crafts catalyst, such as aluminium trichloride, dissolved in a lower alkyl halide, such as methyl chloride or ethyl chloride. Butyl rubbers have a viscosity average molecular weight between about 200,000 and 1,500,000 and an iodine number between about 1 and 50.

The butyl rubber may be halogenated, e.g. chlorinated, without molecular weight degradation taking place, by dissolving the butyl rubber in a solvent such as heptane or benzene and then chlorinating the dissolved rubber in the presence of an acidic anhydride. The chlorinating agent may be chlorine or a solution of hydrogen chloride of concentration of 10 to 60 wt. percent, and the chlorination may be carried out at temperatures of from $-50°$ to $+200°$ C. and pressures of from 0.1 to 500 p.s.i.a.

Heretofore considerable difficulty has been experienced in curing halogenated rubbery polymers and co-polymers at room temperature. It has now been found that if halogenated rubbery polymers of iso-olefins or co-polymers of iso-olefins with multi-olefins have a sufficiently low Mooney viscosity (M.L. 4, 212° F.) such polymers or co-polymers can be cold cured with suitable curing agents and, preferably, selected accelerators, as hereinafter set out. It has been found, further, that if the Mooney viscosity is too low the halogenated polymer molecule has insufficient functionality to cure properly. The invention therefore, consists in selecting a halogenated rubbery polymer having a suitable Mooney viscosity and treating it with a curing agent, and preferably an accelerator, selected from the groups hereinafter referred to.

The halogenated hydrocarbon rubbery polymers or co-polymers of a low degree of polymerisation employed as the basic constituents of the present invention preferably have a Mooney viscosity (M.L. 4, 212° F.) not exceeding 20 and not below 10. These polymers may be obtained in a number of ways. For example, in co-pending Patent Application No. 9790/61, now British Patent 926,809, there is described the peptisation of halogenated hydrocarbon polymers, for example chlorinated butyl rubbers having a Mooney viscosity of above 40 (M.L. 4, 212° F.), by treatment with a peptising agent in the presence of an N-halogen compound whereby depolymerisation and reduction to the desired Mooney viscosity is achieved. As peptising agents there is described the employment of per-oxygen compounds, such as per-acids, for example perbenzoic acid, or peroxides, preferably organic peroxides, for example di-cumyl peroxide. The N-halogen compounds are preferably organic N-chloro compounds, particularly those that are soluble in the reaction mixture such as N,N'-dichloro 5,5 dimethylhydantoin. By this method we have obtained halogenated hydrocarbon polymers, such as chlorinated butyl rubbers, having a Mooney viscosity of between 10 and 20, and particularly between 10 and 15 (4 minutes at 212° F., large roter).

The low viscosity materials hereinbefore referred to are employed to form the basis of cold curing mastic compositions and are advantageously employed in the production of non-black mastic compositions. Fillers and additives, conventionally used in the compounding of known mastic compositions, may be employed in compounding the mastic compositions of the present invention as will be seen from the example compositions of the invention hereinafter set out.

The mastic compositions of the required Mooney viscosity (M.L. 4, 212° F.) are cold cured by the employment of a metal chloride, such as stannous chloride or zinc chloride, and a cyclic tri-thio-carbonate, such as ethylene tri-thio-carbonate, or a metal oxide such as zinc oxide, calcium oxide or magnesium oxide, and an alkyl polyamine such, for example, as di-ethylene triamine or penta-ethylene pentamine. Other cold curing agents that have been found to give useful results are aromatic hydroxides such as resorcinol and catechol and redox systems.

Examples of suitable cold curing systems are ethylene or propylene trithiocarbonate with stannous chloride and salicyclic acid, with or without a metal oxide such as zinc oxide, or diethylene triamine, or tetra-ethylene pentamine, in combination with a metal oxide, for example magnesium oxide, and quinyl dioxime together with lead dioxide.

We have found that, as the Mooney viscosity of the mastic base compound is lowered, the ease of incorporation of fillers and curing agents is enhanced so that the need to employ expensive equipment for mixing the ingredients of the compositions, and to add softeners, such as oils and solvents, becomes less. It is desirable that the amount of softener required is reduced to a minimum since there is a tendency for softeners to bleed or volatilise with consequent risk of hardening and cracking of the mastic composition.

We have found that plasticisers tend to retard curing although this retardation is less marked when using ester plasticisers instead of oils. We have found, further, that reactive plasticisers serve to overcome the dilution effects of other plasticisers such as oils, are faster curing and can be used to give improved vulcanizate properties. For example, epoxy resins give fast cures when used in conjunction with a tetraethylene pentamine curing system but are retarded when plasticising oils are present. Reactive plasticisers, such as epoxy resins, however, are difficult to incorporate into the mastic compositions. Amongst suitable non-reactive plasticisers are the non-reactive chlorinated paraffins and chlorinated di-phenyls whilst further examples of useful reactive plasticisers are phenol formaldehyde resins, neoprene FB, liquid natural rubber and divinyl benzene.

In order to further illustrate the invention reference is made to the following examples.

*Example I*

A mastic base composition was obtained by milling together 100 parts by weight of a chlorinated butyl rubber (wood-hogged chlorinated butyl rubber) with 7 parts by weight of N,N'-dichloro 5:5 dimethylhydantoin and 0.75 parts by weight of dicumyl peroxide at 300° F. for 10 minutes. The resulting material, which had a Mooney viscosity of between 10 and 15 (4 minutes at 212° F., large roter) was made up with the following four formulations, all parts being by weight, using known and conventional compounding materials and mixing the ingredients together in known manner.

| Compositions | A | B | C | D |
|---|---|---|---|---|
| Mastic base | 107.75 | 107.75 | 107.75 | 107.75 |
| Petroleum resin (used as a tackifier) | 25 | 25 | 25 | 25 |
| A hydrogenated wood resin ester (used as a plasticiser) | 10 | 10 | 10 | 10 |
| Phenol methylol resin | 20 | 20 | 20 | 20 |
| Short fibre asbestos | 50 | 50 | 50 | 50 |
| Calcium carbonate | 150 | | 150 | 200 |
| China clay | | 150 | | |
| Polyisobutylene (Mol. wt. about 10,000) | 10 | 10 | 15 | 15 |
| Light Process Oil | 40 | 40 | 60 | 60 |

Samples of each of the four basic compositions "A," "B," "C" and "D" were cured respectively with one of the following two curing systems, added in the weight proportions shown, curing being carried out at ambient atmospheric temperature and pressure after simple incorporation on a mill.

1st curing system: Parts by weight
    Ethylene trithiocarbonate _____ 1
    Zinc oxide _____ 5
    Stannous chloride _____ 2
    Salicylic acid _____ 2

2nd curing system:
    Diethylene triamine _____ 2
    Heavy calcined MgO _____ 5

The following tables, Table I and Table II, show, respectively, the adhesion of depolymerized chlorbutyl mixtures to a metal and the hardening of the said mastics.

TABLE I.—ADHESION OF DEPOLYMERIZED CHLOROBUTYL MASTICS TO ALUMINIUM

| Days | Force to separate 1" square aluminium plates, lbs./sq. in. | | | | | | | |
|---|---|---|---|---|---|---|---|---|
| | 1st Curing System | | | | 2d Curing System | | | |
| | A | B | C | D | A | B | C | D |
| 1 | 9.7 | 8.2 | 8.7 | 10.0 | 5.6 | 6.6 | 7.1 | 7.2 |
| 2 | 6.7 | 7.1 | 8.0 | 5.6 | 5.8 | 8.2 | 7.5 | 6.2 |
| 5 | 10.8 | 11.2 | 12.3 | 9.9 | 7.1 | 8.2 | 8.4 | 9.2 |
| 8 | 10.2 | 10.4 | 10.5 | 9.6 | 6.3 | 9.8 | 9.7 | 8.0 |
| 13 | 12.4 | 10.0 | 20.0 | 10.8 | 8.4 | 8.6 | 9.4 | 8.8 |
| 20 | 13.8 | 11.3 | 36.5 | 11.6 | 8.5 | 10.5 | 9.6 | 9.4 |

Visual Rating after 20 days (best cure first)

| 2 | 4 | 1 | 6 | 3 | 7 | 5 | 8 |
|---|---|---|---|---|---|---|---|

TABLE II.—HARDENING OF DEPOLYMERIZED CHLOROBUTYL MASTICS

| Days | Grease Penetrometer Results (15 secs. 100 gramme load penetration in mms.) | | | | | | | |
|---|---|---|---|---|---|---|---|---|
| | 1st Curing System | | | | 2d Curing System | | | |
| | A | B | C | D | A | B | C | D |
| 1 | 9.3 | 7.1 | 9.2 | 7.9 | 11.9 | 9.7 | 10.8 | 9.6 |
| 2 | 9.1 | 7.2 | 9.4 | 8.1 | 11.8 | 10.9 | 10.8 | 9.1 |
| 5 | 7.3 | 6.5 | 8.1 | 7.0 | 10.6 | 8.7 | 9.2 | 7.8 |
| 6 | 7.3 | 6.5 | 8.0 | 7.0 | 10.9 | 9.6 | 9.2 | 7.8 |
| 7 | 7.3 | 6.3 | 8.0 | 7.0 | 9.9 | 8.9 | 9.0 | 7.9 |
| 8 | 7.0 | 6.1 | 7.2 | 6.9 | 9.9 | 8.7 | 8.8 | 7.8 |
| 13 | 6.5 | 6.1 | 7.0 | 6.6 | 10.0 | 8.8 | 8.6 | 7.8 |
| 15 | 6.6 | 6.2 | 6.5 | 6.8 | 9.8 | 8.7 | 8.3 | 7.8 |
| 16 | 6.5 | 6.3 | 6.5 | 6.8 | 9.8 | 8.7 | 8.2 | 7.8 |
| 19 | 6.5 | 6.1 | 5.7 | 6.6 | 7.8 | 8.7 | 7.2 | 6.9 |
| 20 | 6.2 | 6.1 | 5.6 | 6.5 | 7.7 | 8.7 | 7.1 | 6.8 |

Table III shows how the presence of process oils retards the cure rate of the mastic compositions. On the other hand, the presence of factice gives a faster cure rate and facilitates mixing. Curing studies, detailed in this table, were carried out at room temperature by compression deflection testing.

TABLE III

| | Composition | | | | | | | | | |
|---|---|---|---|---|---|---|---|---|---|---|
| | 1 | 2 | 3 | 4 | 5 | 6 | 7 | 8 | 9 | 10 |
| | Parts by weight | | | | | | | | | |
| Chlorinated buytl rubber H7-10-66 (M.L. 4, 212° F. about 35) | 100 | 100 | 100 | 100 | 100 | | | | | |
| Low M.W. chlorbutyl containing 1.8% chlorine | | | | | | 100 | 100 | 100 | 100 | 100 |
| Devolite clay | 50 | 50 | 50 | 50 | 50 | 50 | 50 | 50 | 50 | 50 |
| Zinc oxide | 10 | 10 | 10 | 10 | 10 | 10 | 10 | 10 | 10 | 10 |
| Salicylic acid | 2 | 2 | 2 | 2 | 2 | 2 | 2 | 2 | 2 | 2 |
| Stannous chloride | 2 | 2 | 2 | 2 | 2 | 2 | 2 | 2 | 2 | 2 |
| Ethylene trithiocarbonate | 1 | 1 | 1 | 1 | 1 | 1 | 1 | 1 | 1 | 1 |
| 25% paraffinic process oil | | 60 | 30 | | 10 | | 60 | 30 | | 30 |
| Highly paraffinic process oil (Barosa Oil) | | | 30 | 60 | | | | 30 | 60 | |
| Whitbro factice | | | | | | 30 | | | | 30 |
| | Percent | | | | | | | | | |
| Compression deflection after— | | | | | | | | | | |
| 0 days | 12 | 70 | 70 | 70 | 60 | 20 | 90 | 90 | 90 | 90 |
| 5 days | 9.4 | 59 | 57 | 53.2 | 40 | 13.6 | 82 | 82 | 81.6 | 76 |
| 10 days | 7.8 | 53 | 51 | 49.6 | 35 | 13.7 | 79.4 | 79.4 | 79.8 | 74.6 |
| 15 days | 7.5 | 45.4 | 44.4 | 46.1 | 30.8 | 13.0 | 78.0 | 77.6 | 78.4 | 70.8 |
| 25 days | 7.4 | 43 | 42 | 43.6 | 30.4 | 12.9 | 75 | 74.6 | 76.6 | 68 |

Table IV shows the effect of adding a reactive plasticiser (epoxy resin)

TABLE IV

|  | Composition | | | | | | | |
|---|---|---|---|---|---|---|---|---|
|  | 1 | 2 | 3 | 4 | 5 | 6 | 7 | 8 |
|  | Parts by weight | | | | | | | |
| Low M.W. chlorobutyl containing 1.8% chlorine | 100 | 100 | 100 | 100 | 100 | 100 | 100 | 100 |
| Devolite clay | 50 | 50 | 50 | 50 | 50 | 50 | 50 | 50 |
| Tetraethylene pentamine | 7.5 | 7.5 | 7.5 | 7.5 | 7.5 | 7.5 | 7.5 | 7.5 |
| Light calcined MgO | 10 | 10 | 10 | 10 | 10 | 10 | 10 | 10 |
| Liquid epoxy resin |  | 10 | 20 |  | 5 | 10 | 20 | 10 |
| 25% paraffinic process oil |  |  |  | 60 | 60 | 60 | 60 | 60 |
| Whitbro factice |  |  |  |  |  |  |  | 30 |
|  | Percent | | | | | | | |
| Compression deflection after— | | | | | | | | |
| 0 days | 20 | 20 | 20 | 90 | 90 | 90 | 90 | 85 |
| 5 days | 11.5 | 4.0 | 3.8 | 77.4 | 78 | 81 | 82 | 76 |
| 10 days | 10.8 | 3.6 | 75.6 | 76 | 79 | 79.5 | 81 | 76 |
| 15 days | 10.2 | 3.5 | 73.2 | 74.4 | 77.5 | 97.5 | 80.5 | 72.9 |
| 20 days | 9.7 | 3.4 | 71.4 | 73.3 | 76.5 | 76.5 | 80 | 68 |

Tetramethylene pentamine, being a polyalkyl amine, is a known curing agent for epoxy resins. It has the advantage that, being a liquid at ambient temperatures, it is readily dispersed in the mastic composition.

Table V shows the effect of employing Neoprene FB, a low molecular weight polychloroprene, as a reactive plasticiser.

TABLE V

|  | Composition | | | | |
|---|---|---|---|---|---|
|  | 1 | 2 | 3 | 4 | 5 |
|  | Parts by weight | | | | |
| Low M. W. chlorbutyl (containing 1.8% chlorine) | 100 | 100 | 100 | 100 | 100 |
| 25% paraffinic process oil | 60 | 60 | 60 | 60 | 60 |
| Devolite clay | 50 | 50 | 50 | 50 | 50 |
| Neoprene FB |  | 5 | 10 | 20 | 10 |
| Tetraethylene pentamine (adjusted to include the amount needed for the Neoprene FB) | 7.5 | 7.875 | 8.25 | 9.0 | +8.25 |
| Light calcined MgO | 10 | 10.5 | 11 | 12 | 11 |
| Sulphur |  |  |  |  | 0.2 |
|  | Percent | | | | |
| Compression deflection after— | | | | | |
| 0 days | 90 | 88 | 84 | 82 | 88 |
| 5 days | 77.4 | 80.8 | 76.3 | 74.0 | 79.2 |
| 10 days | 75.6 | 79.5 | 74 | 72.9 | 78.4 |

*Example II*

A highly unsaturated (at least 4% unsaturation) low molecular weight (about 2000) chlorinated butyl rubber was compounded with finely divided silica. One sample of this compounded rubber was cured in the presence of ethylene-tri-thio-carbonate, and another sample was cured in the presence of ethylene-tri-thio-carbonate and salicylic acid. The curing was carried out at room temperature, and the tensile strength of the two cured samples subsequently measured. The results obtained are as shown in Table VI.

TABLE VI

| Curing System (parts by weight per 100 parts chlorinated butyl rubber): | | |
|---|---|---|
| ZnO | 5 | 5 |
| $SnCl_2 \cdot 2H_2O$ | 2 | 2 |
| Ethylenetrithiocarbonate | 1 | 1 |
| Salicylic Acid |  | 2 |
| Tensile Strength, p.s.i. after— | | |
| 2 days | 590 | 790 |
| 21 days | 980 | 1,400 |

*Example IV*

Chlorinated butyl rubber was depolymerised by milling the rubber with dicumyl peroxide and N,N-dichloro-5,5-dimethylhydantoin at temperatures of from 180° to 300° F. to produce a rubber having a Mooney viscosity of from 10 to 15. This depolymerised low molecular weight chlorinated butyl rubber was then compounded with finely divided calcium carbonate. One sample of this compound rubber was cured in the presence of ethylenetrithiocarbonate, and another sample was cured in the presence of ethylenetrithiocarbonate and salicylic acid. The curing was carried out at room temperature, and the pull in lbs. needed to separate two 1" square aluminium plates, when the samples were placed between the plates, subsequently measured. The results obtained are as shown in Table VII.

TABLE VII

| Curing System (parts by weight per 100 parts chlorinated butyl rubber): | | |
|---|---|---|
| ZnO | 5 | 5 |
| $SnCl_2 \cdot 2H_2O$ | 2 | 2 |
| Ethylenetrithiocarbonate | 1 | 1 |
| Salicylic Acid |  | 2 |
| Pull in lbs. to separate two 1" square aluminium plates after— | | |
| 0 days |  |  |
| 7 days | 9.9 | 9.2 |
| 15 days | 14.2 | 38.7 |
|  | 36.0 | 59.2 |

*Example V*

Chlorobutyl rubber was compounded with HAF carbon black. One sample of this compound rubber was cured in the presence of ethylene-trithiocarbonate, and another sample was cured in the presence of ethylene-trithiocarbonate and salicylic acid. The curing was carried out at room temperature, and the tensile strength of the two samples subsequently measured. The results obtained are as shown in Table VIII.

TABLE VIII

| Curing System (parts by weight per 100 parts chlorinated butyl rubber): | | |
|---|---|---|
| ZnO | 5 | 5 |
| $SnCl_2 \cdot 2H_2O$ | 2 | 2 |
| Ethylenetrithiocarbonate | 1 | 1 |
| Salicylic Acid | | 2 |
| Tensile Strength, p.s.i. after— | | |
| 2 days | 700 | 465 |
| 12 days | 1,070 | 790 |

The results obtained in the above examples clearly demonstrate the salicylic acid accelerates the cold curing of chlorobutyl rubber when compounded with non-carbon black fillers and with ethylene-trithiocarbonate.

What we claim is:

1. A composition comprising a major proportion of a rubbery chlorinated copolymer of about 90 to 99.5 wt. percent of a $C_4$ to $C_7$ isoolefin and about 10 to 0.5 wt. percent of a $C_4$ to $C_8$ multiolefin, said copolymer having a Mooney viscosity of from 10 to 20, and a minor proportion of a combination of (1) a Group II metal oxide, (2) an alkylene trithiocarbonate, (3) salicylic acid and (4) a metal halide selected from the group consisting of zinc chloride and stannous chloride.

2. A composition according to claim 1, wherein the rubbery chlorinated copolymer has a Mooney viscosity of from 10 to 15.

3. A composition according to claim 1, wherein the compounds represented by (1), (2), (3) and (4) are ethylene trithiocarbonate, zinc oxide, stannous chloride and salicylic acid.

4. A composition according to claim 1, wherein the isoolefin is isobutylene and the multiolefin is isoprene.

5. The composition of claim 1 which has been compounded with a non-carbon black filler.

6. A composition comprising a major proportion of a rubbery chlorinated copolymer of about 90 to about 99.5 wt. percent of a $C_4$–$C_7$ isoolefin and about 10 to about 0.5 wt. percent of a $C_4$–$C_8$ multiolefin, said copolymer having a Mooney viscosity of from 10 to 20, and a minor proportion of a combination of (1) a Group II metal oxide, (2) a $C_2$–$C_3$ alkylene trithiocarbonate, (3) salicylic acid and (4) a metal halide selected from the group consisting of zinc chloride and stannous chloride.

7. A composition comprising a chlorinated copolymer of about 90 to about 99.5 wt. percent of a $C_4$–$C_7$ isoolefin and about 10 to about 0.5 wt. percent of a $C_4$–$C_8$ multiolefin, said copolymer having a Mooney viscosity of from about 10 to about 20, and per 100 parts of said chlorinated copolymer (1) between about 5 and about 10 parts of a Group II metal oxide, (2) about one part of a $C_2$–$C_3$ alkylene trithiocarbonate, (3) about 2 parts of salicylic acid and (4) about 2 parts of a metal halide selected from the group consisting of zinc chloride and stannous chloride.

8. The composition of claim 7, wherein the chlorinated copolymer has a Mooney viscosity of between about 10 and about 15.

9. The composition of claim 7 wherein the Group II metal oxide is zinc oxide and the alkylene trithiocarbonate is ethylene trithiocarbonate.

10. A process for preparing a cold cured mastic composition which comprises admixing, per 100 parts of a chlorinated copolymer of about 90 to about 99.5 wt. percent of a $C_4$–$C_7$ isoolefin and about 10 to about 0.5 wt. percent of a $C_4$–$C_8$ multiolefin, said copolymer having a Mooney viscosity of from about 10 to about 20, (1) between about 5 and about 10 parts of a Group II metal oxide, (2) about 1 part of a $C_2$–$C_3$ alkylene trithiocarbonate, (3) about 2 parts of salicylic acid and (4) about 2 parts of a metal halide selected from the group consisting of zinc chloride and stannous chloride and curing said admixture at room temperature.

11. A process according to claim 10 wherein the isoolefin is isobutylene and the multiolefin is isoprene.

12. A process according to claim 10 wherein the Group II metal oxide is zinc oxide and the alkylene trithiocarbonate is ethylene trithiocarbonate.

13. The process of claim 10 wherein the chlorinated copolymer is prepared by depolymerizing a chlorinated copolymer having a Mooney viscosity of about 40 with an organic peroxide in the presence of N,N'-dichloro-5,5-dimethylhydantoin at a temperature of between about 100° F. and about 300° F.

14. The process of claim 10 wherein the chlorinated copolymer has a Mooney viscosity of between about 10 and about 15.

15. The process of claim 13 wherein the depolymerized chlorinated copolymer is prepared by milling together 100 parts by weight of chlorinated copolymer, 7 parts by weight of N,N'-dichloro-5,5-dimethylhydantoin and 0.75 parts by weight of dicumyl peroxide and heating at 300° F. for 10 minutes.

16. A process for preparing a cold cured mastic composition which comprises curing a chlorinated copolymer of between about 90 and about 99.5 wt. percent of a $C_4$–$C_7$ isoolefin and between about 10 and about 0.5 wt. percent of a $C_4$–$C_8$ multiolefin, said copolymer having a Mooney viscosity of between about 10 and about 20, at room temperature with a minor amount of a combination of (1) a Group II metal oxide, (2) an alkylene trithiocarbonate, (3) salicylic acid, and (4) a metal halide selected from the group consisting of zinc chloride and stannous chloride.

References Cited

UNITED STATES PATENTS

| 2,395,778 | 2/1946 | Breck et al. | 260—85.3 |
| 2,926,718 | 3/1960 | Baldwin et al. | 260—45.5 |
| 3,018,275 | 1/1962 | Cottle | 260—85.3 |
| 3,033,838 | 5/1962 | Ray | 260—85.3 |
| 3,076,778 | 2/1963 | Minckler et al. | 260—83.3 |
| 3,085,074 | 4/1963 | Burke et al. | 260—45.5 |
| 3,197,446 | 7/1965 | Ziarnik et al. | 260—79.5 |
| 3,255,154 | 6/1966 | Dudley | 260—85.3 |

FOREIGN PATENTS 1,000,992  1/1957  Germany.

J. A. SEIDLECK, *Primary Examiner.*

WILLIAM H. SHORT, JOSEPH L. SCHOFER,
*Examiners.*

J. W. SWANNER, E. J. SMITH, *Assistant Examiners.*